US010293868B2

(12) United States Patent
Jerggess et al.

(10) Patent No.: US 10,293,868 B2
(45) Date of Patent: May 21, 2019

(54) REMOVABLE TAILGATE WITH LOCKING HINGE

(71) Applicant: FORD GLOBAL TECHNOLOGIES, LLC, Dearborn, MI (US)

(72) Inventors: Rafic Jergess, Warren, MI (US); Spencer Monroe Dinkins, III, Rochester Hills, MI (US); Adrian Nania, Rochester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 143 days.

(21) Appl. No.: 15/446,269

(22) Filed: Mar. 1, 2017

(65) Prior Publication Data

US 2018/0251164 A1 Sep. 6, 2018

(51) Int. Cl.

| | |
|---|---|
| ***B62D 33/03*** | (2006.01) |
| ***B62D 33/033*** | (2006.01) |
| ***B62D 33/037*** | (2006.01) |
| ***E05D 7/10*** | (2006.01) |
| ***E05D 11/00*** | (2006.01) |
| ***E05D 11/10*** | (2006.01) |
| ***E05B 85/06*** | (2014.01) |
| ***E05F 15/611*** | (2015.01) |

(52) U.S. Cl.

CPC ........... *B62D 33/033* (2013.01); *B62D 33/03* (2013.01); *B62D 33/037* (2013.01); *E05B 85/06* (2013.01); *E05D 7/1016* (2013.01); *E05D 11/00* (2013.01); *E05D 11/10* (2013.01); *E05F 15/611* (2015.01); *E05D 2007/1038* (2013.01); *E05Y 2900/546* (2013.01)

(58) Field of Classification Search

CPC .... B62D 33/033; B62D 33/037; B62D 33/03; E05F 15/611; E05B 85/06; E05D 11/00; E05D 7/1016; E05D 11/10; E05D 2007/1038; E05Y 2900/546

USPC .................. 296/57.1, 50, 146.11, 53, 52, 55

See application file for complete search history.

(56) References Cited

U.S. PATENT DOCUMENTS 5,004,287 A * 4/1991 Doyle ................ B62D 33/0273 16/260
5,352,008 A * 10/1994 Denvir .............. B62D 33/0273 296/180.1
5,415,058 A * 5/1995 Young ..................... B60R 25/00 280/507
5,823,022 A * 10/1998 Barker .............. B62D 33/0273 70/38 A
6,357,813 B1 3/2002 Vandeberghe et al.

(Continued)

OTHER PUBLICATIONS

Non-final Office Action dated Dec. 7, 2018 for U.S. Appl. No. 15/434,878, filed Feb. 16, 2017.

*Primary Examiner* — Jason S Morrow
*Assistant Examiner* — E Turner Hicks
(74) *Attorney, Agent, or Firm* — Jason Rogers; Vichit Chea; King & Schickli, PLLC

(57) ABSTRACT

A hinge assembly for moving a tailgate about a hinge axis. The hinge assembly includes a first hinge part and a second hinge part for mating with the first hinge part. The second hinge part may be moved to a release position for releasing from the first hinge part, and a lock is provided for locking the second hinge part in the release position. A tailgate including the hinge assembly is also disclosed, which may also be provided with a powered raising and lowering capability. A related method is also disclosed.

20 Claims, 12 Drawing Sheets

(56) References Cited

U.S. PATENT DOCUMENTS

| | | | |
|---|---|---|---|
| 6,398,288 | B1 | 6/2002 | Yuge |
| 6,425,205 | B2 | 7/2002 | Wygle et al. |
| 6,520,557 | B2 | 2/2003 | Benthaus et al. |
| 6,637,796 | B1 | 10/2003 | Westerdale et al. |
| 6,719,356 | B2 | 4/2004 | Cleland et al. |
| 6,764,122 | B2 | 7/2004 | Kharod |
| 6,814,392 | B1 | 11/2004 | Tomaszewski |
| 6,964,449 | B2 | 11/2005 | Takeda et al. |
| 7,069,695 | B2 | 7/2006 | Hattori et al. |
| 7,258,373 | B2 | 8/2007 | Plett et al. |
| 7,287,803 | B2 | 10/2007 | Koneval et al. |
| 7,484,784 | B2 | 2/2009 | Ohly |
| 7,500,706 | B2 | 3/2009 | Anderson et al. |
| 7,533,920 | B2 | 5/2009 | Ohly |
| 7,549,691 | B2 * | 6/2009 | Schulte .............. B62D 33/0273 296/50 |
| 8,008,910 | B2 | 8/2011 | Booth et al. |
| 8,696,046 | B2 * | 4/2014 | Sackett .............. B62D 33/0273 296/50 |
| 9,097,045 | B2 | 8/2015 | Hausler et al. |
| 9,234,378 | B2 * | 1/2016 | Hansen ................... E05F 15/63 |
| 2004/0040213 | A1 | 3/2004 | McCarthy-Garland et al. |
| 2006/0181108 | A1 | 8/2006 | Cleland et al. |
| 2007/0132264 | A1 | 6/2007 | Koneval et al. |
| 2008/0054667 | A1 | 3/2008 | Ohly |
| 2012/0272479 | A1 | 11/2012 | Rasel et al. |
| 2015/0315837 | A1 | 11/2015 | Salmon et al. |

* cited by examiner

REMOVABLE TAILGATE WITH LOCKING HINGE

TECHNICAL FIELD

This document relates generally to the motor vehicle field and, more particularly, to a removable tailgate for a vehicle, such as a pickup truck, that includes a locking hinge.

BACKGROUND

Removable tailgates have been proposed, which when removed reduce the vehicle weight and thus increase the towing capacity. While removal of the tailgate may be straightforward, it is typically a large and unwieldy component that can be difficult to return to the installed position. This is especially true if the position of the component on the tailgate forming the hinge has changed subsequent to the removal, since it will no longer align with the corresponding component on the vehicle. Theft of the removable tailgate is also a concern, since known removable tailgates also lack any sort of lock to maintain security.

Thus, a need is identified for a removable tailgate that can be easily reinstalled without misalignment of the hinge, and which may independently guard against theft of the tailgate.

SUMMARY

In accordance with the purposes and benefits described herein, a hinge assembly for moving a tailgate about a hinge axis is proposed. The assembly includes a first hinge part and a second hinge part for mating with the first hinge part. The second hinge part has a release position for releasing from the first hinge part. A lock is provided for locking the second hinge part in the release position.

In one embodiment, the second hinge part comprises a female hinge part including an opening for receiving a male hinge part serving as the first hinge part in a radial direction relative to the hinge axis. The lock may comprise a shaft adapted for engaging the female hinge part in a locked position to prevent rotation of the female hinge part relative to the tailgate. The shaft may include a projection for engaging a notch in the female hinge part in the locked position.

A cylinder may also be provided for receiving a key. The key may be used for selectively locking and unlocking the shaft. The key may actuate a pin for locking the position of shaft.

The lock may comprise a cover for at least partially covering the opening in a locked position to prevent the male hinge part from exiting in the radial direction. The cover may be mounted for pivoting to expose the opening. The cover may include a tab for pivoting the cover when depressed.

Another aspect of the disclosure pertains to a tailgate assembly for a vehicle. The tailgate assembly comprises a tailgate adapted for being removed from the vehicle, a hinge for raising and lowering the tailgate about a hinge axis, and a lock for locking a position of the hinge relative to the tailgate.

In one embodiment, the hinge comprises a first hinge part and a second, mating hinge part, and the lock is for locking the position of the second hinge part. The second hinge part may include an opening for releasing the first hinge part in a radial direction.

The tailgate assembly may further include a cover for at least partially covering the opening to prevent the removal of the first hinge part therethrough. The cover may include a locked position for covering the opening and an unlocked position for exposing the opening to allow the first hinge part to pass through the opening, the unlocked position of the cover retaining the first hinge part in a fixed position.

The cover may further comprise a shaft adapted for engaging the second hinge part in the fixed position to prevent rotation of the first hinge part relative to the tailgate. The shaft includes a projection for engaging a notch in the second hinge part in the unlocked position. A cylinder may also be adapted for receiving a key for selectively locking and unlocking the shaft. In any embodiment, a motor may be provided for raising and lowering the tailgate, but a manual arrangement could also be used.

Still a further aspect of the disclosure pertains to a method for operating a hinge for a tailgate of a vehicle. The method comprises orienting a hinge part to a release position for separating the tailgate from the vehicle, and locking a position of the hinge part. In one embodiment, the hinge comprises a first hinge part on the vehicle and a second, mating hinge part on the tailgate and including an opening for releasing the first hinge part in a radial direction, and the method further includes at least partially covering the opening to prevent the removal of the first hinge part therethrough.

In the following description, there are shown and described several preferred embodiments of a removable tailgate for a pickup truck that includes a locking hinge. As it should be realized, the arrangement is capable of other, different embodiments and its several details are capable of modification in various, obvious aspects all without departing from the removable tailgate for a pickup truck that includes a locking hinge, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the removable tailgate for a pickup truck that includes a locking hinge and, together with the description, serve to explain certain principles thereof. In the drawing figures.

Reference will now be made in detail to the present preferred embodiments of the removable tailgate for a pickup truck that includes a locking hinge, examples of which are illustrated in the accompanying drawing figures.

DETAILED DESCRIPTION

Figure 1:
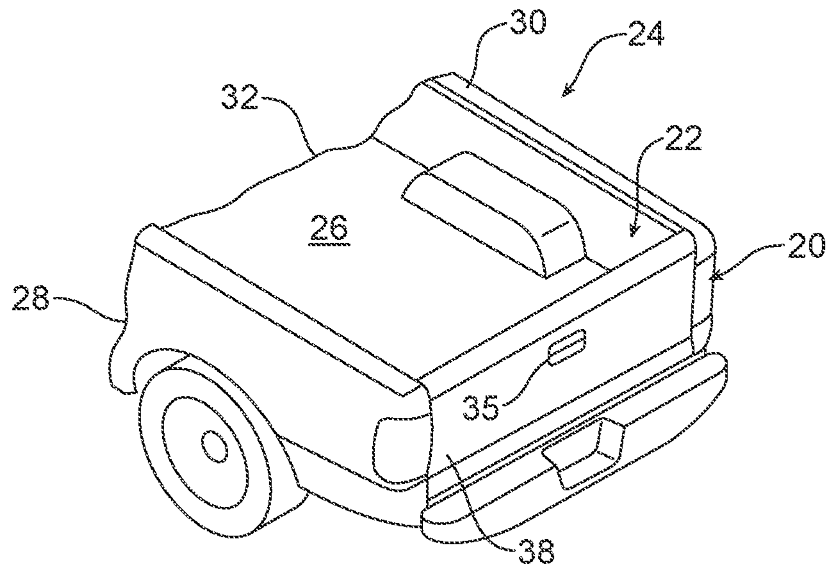
FIG. 1 is a partially cutaway, rear perspective view of a vehicle bed including a tailgate in a retracted position.

Reference is now made to FIG. 1, which illustrates a tailgate 20. The tailgate 20 is adapted to mount to a vehicle 24, such as a pickup truck. The vehicle 24 includes a storage compartment 22 including a bed 26. The bed 26 includes a left rear quarter panel 28, which forms a first vertical surface of the bed 26; a right rear quarter panel 30, which forms a second vertical surface of the bed 26; a floor 32, which extends between the two panels 28, 30; and the tailgate 20.

Figure 2:
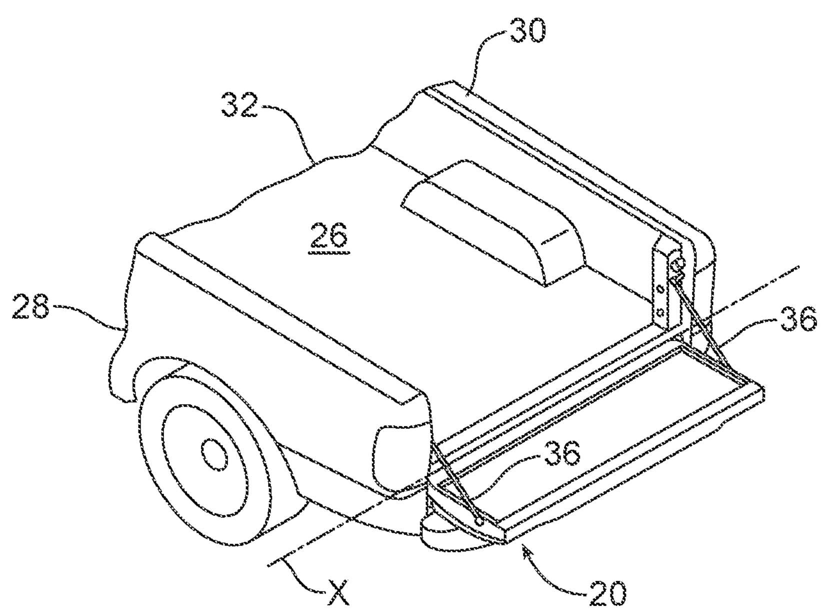
FIG. 2 is a similar view with the tailgate in the lowered position, ready for loading the bed with cargo.

As can be understood by comparing FIGS. 1 and 2, the tailgate 20 is pivotable between a generally vertical closed position and a generally horizontal open position to open and close the bed 26. In this regard, and as perhaps best shown in FIGS. 3 and 7, a pair of tailgate hinges 34*a*, 34*b* cooperate with the side panels 28, 30, and thus form a hinge axis X about which the tailgate 20 pivots. A pair of tailgate supports 36 (such as cables) connected to these panels 28, 30 support the tailgate 20 when in the lowered or horizontal position. A tailgate handle 35 mounts to an outer panel 38, and functions in a conventional manner. The release mechanism for the tailgate 20, as well as tailgate latches, are conventional and well known in the art and so are not shown in detail.

Figure 3:
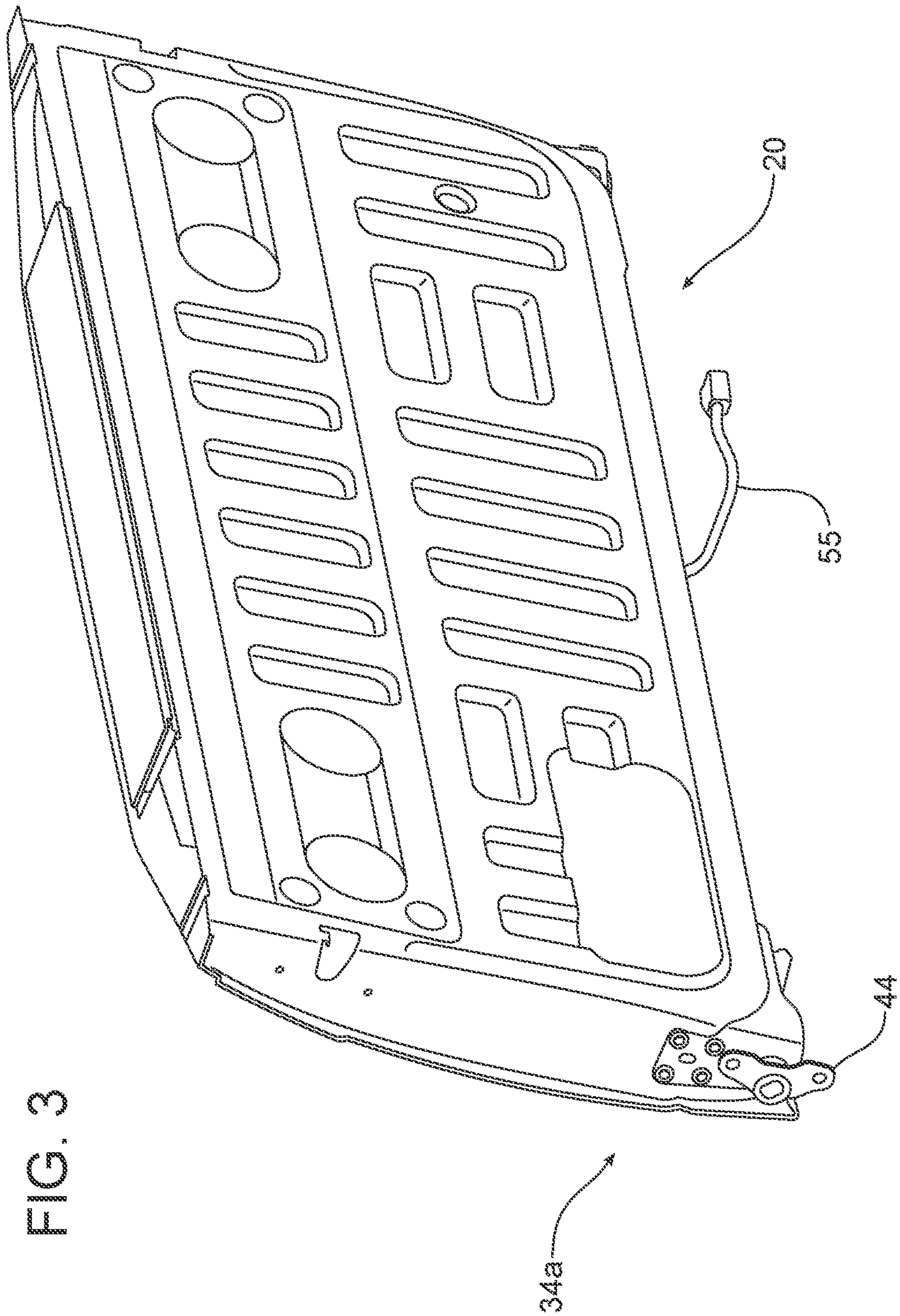
FIG. 3 is a rear perspective view of a tailgate showing a hinge along one side of the tailgate.
Figure 4:
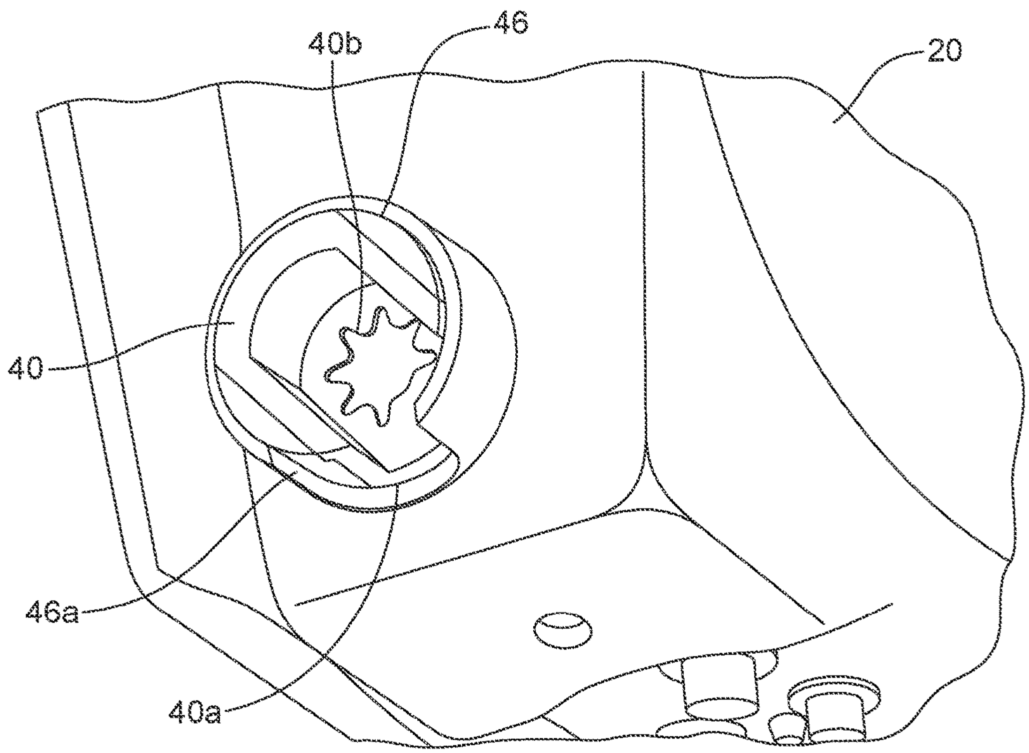
FIG. 4 is an enlarged view of a portion of the hinge part of FIG. 3.
Figure 5:
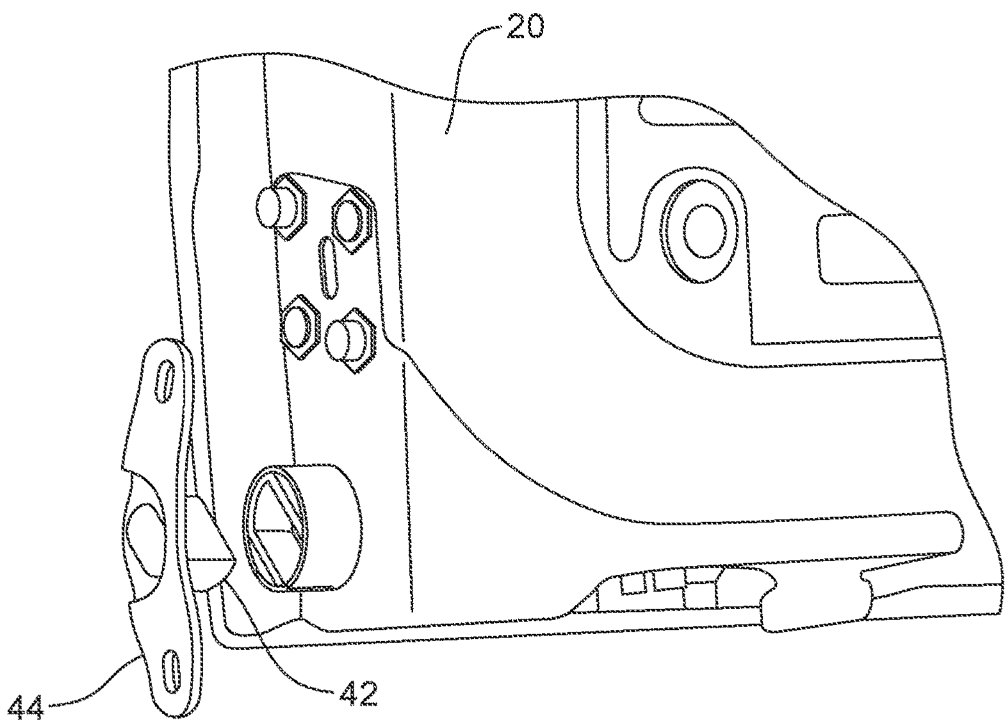
FIGS. 5 and 6 are perspective, cutaway views showing the relative interaction of the first and second hinge parts forming the hinge of FIG. 3.
Figure 6:
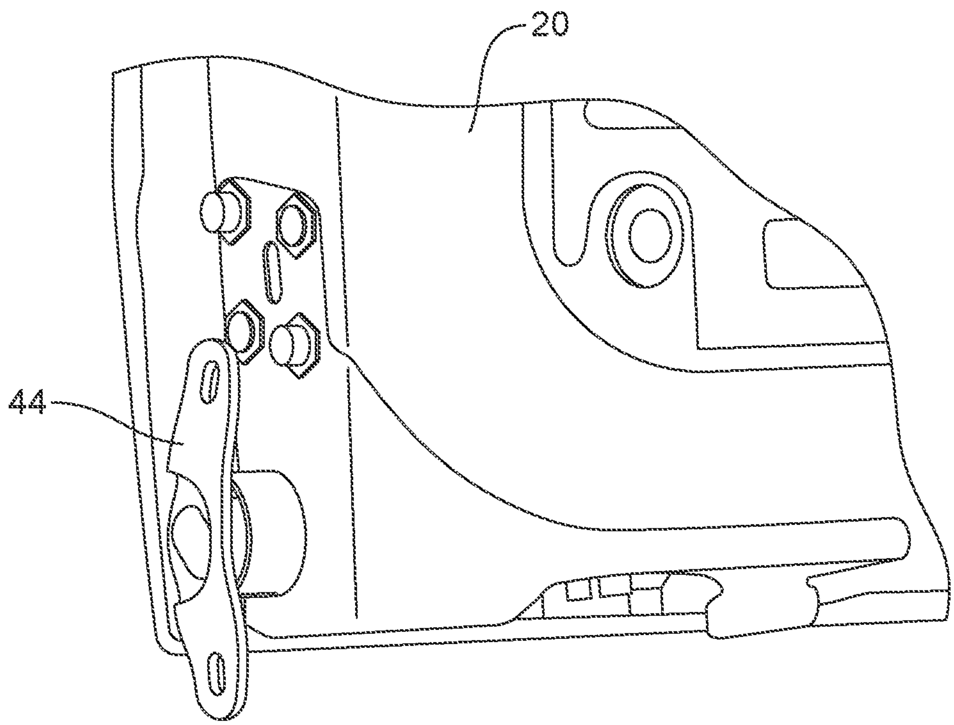

Referring now to FIG. 3 in particular, a first hinge 34*a* for facilitating the raising and lowering of the tailgate 20 can be seen in detail. This first hinge 34*a* includes a female hinge part 40 adapted for receiving and engaging a male hinge part 42 associated with the vehicle 24. As can perhaps be best understood from FIGS. 4 and 5, the male hinge part 42 may have generally parallel, opposed sidewalls that correspond to matching sidewalls internal to the female hinge part 40. The corresponding surfaces when mated thus allow for the transmission of rotary movement between the two parts 40, 42 (but other forms of releasable couplings could be used).

The male hinge part 42 may be fixedly mounted to one side panel (in this case, side panel 30) of the bed 26 by a mounting bracket 44. The female hinge part 40 is mounted for rotation relative to a retainer 46 connected to the tailgate 20. Thus, in connection with the hinge 34*b* at the opposite end (which may be the same or different as hinge 34*a*, as outlined in more detail below), this arrangement allows for the raising and lowering of the tailgate 20 between the positions shown in FIGS. 1 and 2.

To facilitate removal of the tailgate 20 from the vehicle bed 26, the retainer 46 includes an opening 46*a* partially exposing the female hinge part 40. The female hinge part 40 includes a cavity for receiving the male hinge part 42, which cavity includes an open end 40*a*. As can be appreciated, when the open end 40*a* of the female hinge part 40 is aligned with the opening 46*a* of the retainer 46 at a particular point in the rotation (such as for example 45 degrees from vertical), the male hinge part 42 may exit the female hinge part 40 in a radial direction (that is, a direction transverse to a direction of rotation of the female hinge part when the tailgate 20 is raised and lowered).

Figure 7:
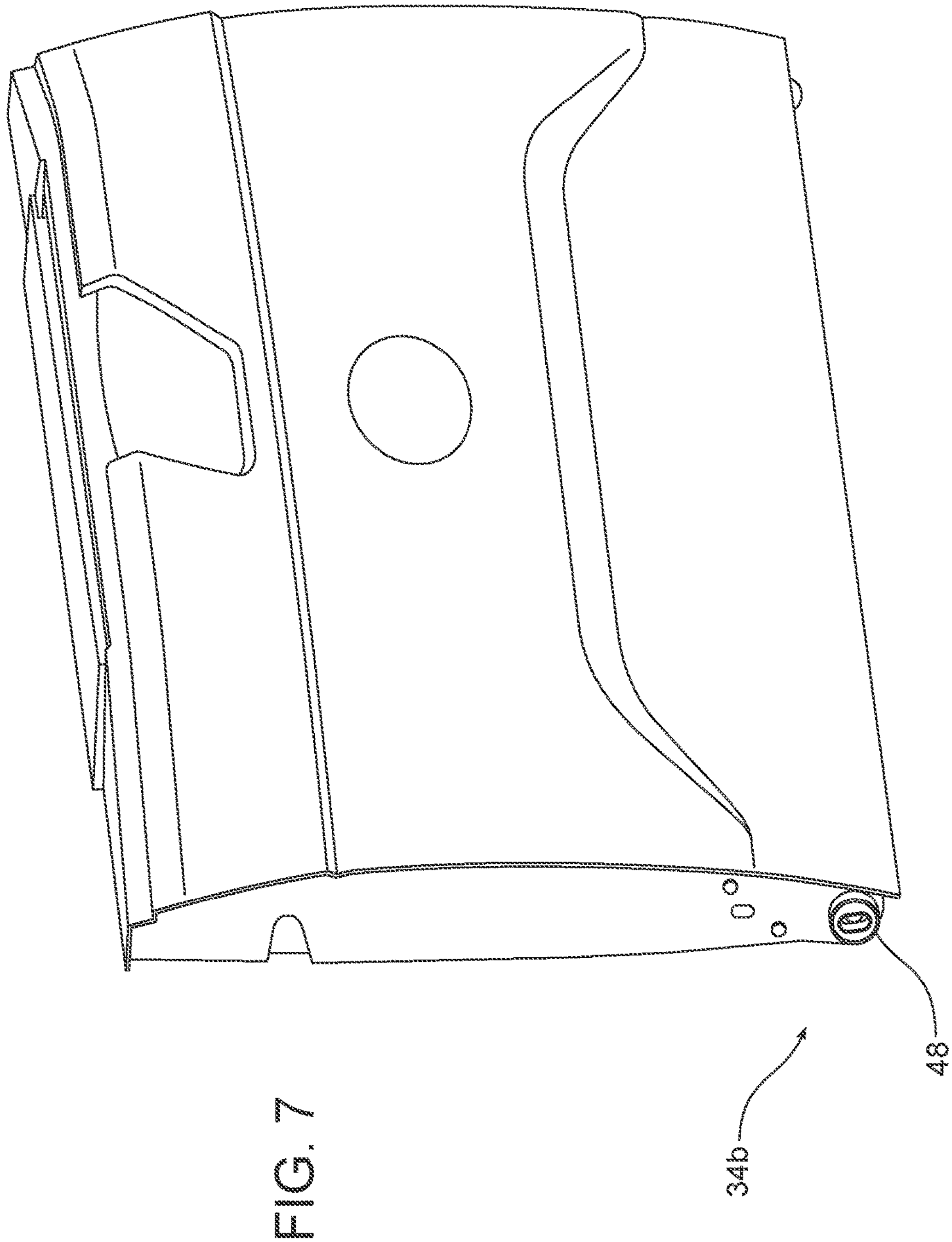
FIG. 7 is a rear perspective view showing the hinge along an opposite side of the tailgate.
Figure 8:
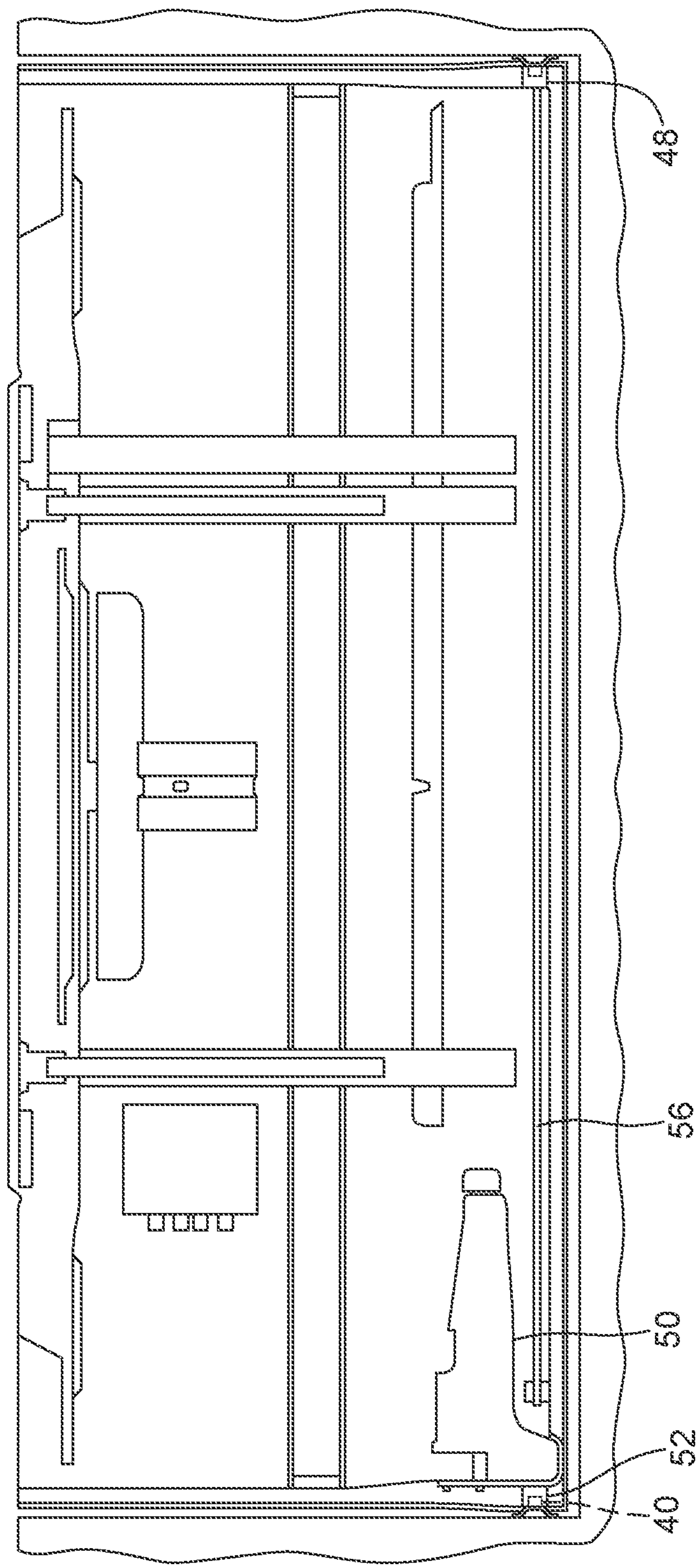
FIG. 8 is a rear elevational view showing a cross-section of the tailgate.
Figure 9:
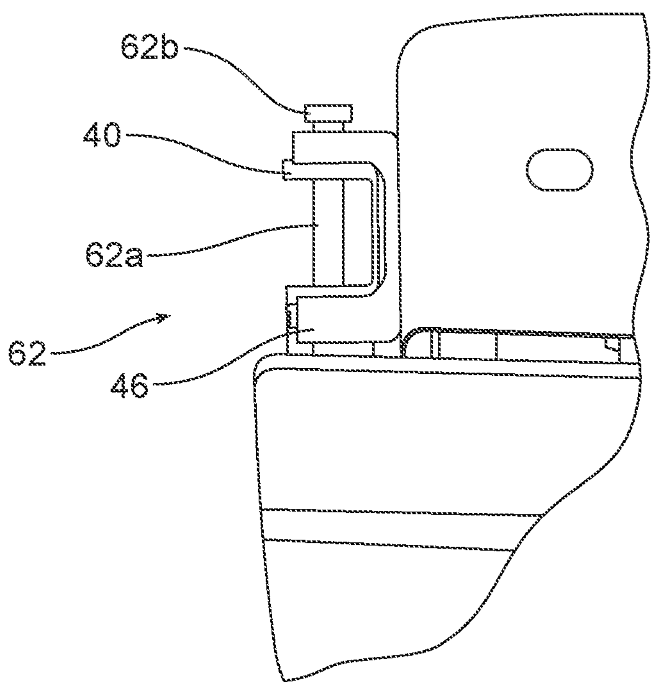
FIGS. 9 and 10 are cutaway top and side views of one embodiment of a lock for the hinge.
Figure 10:
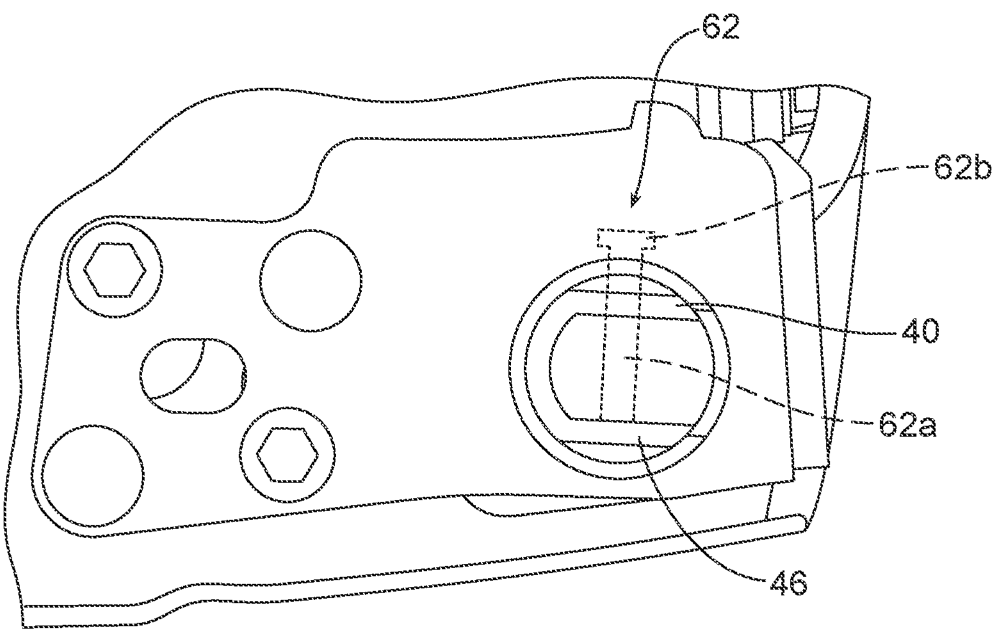
Figure 11:
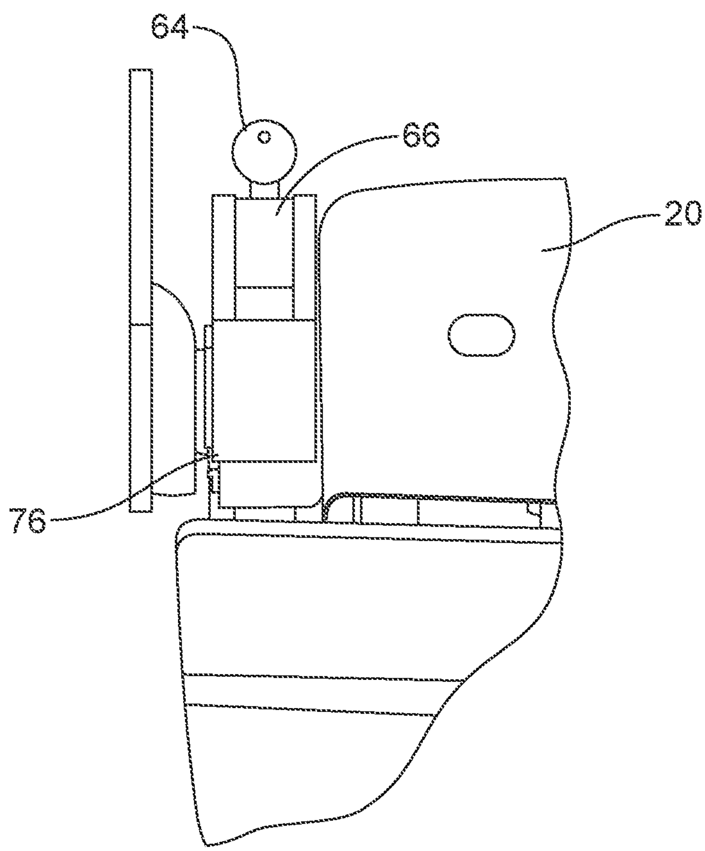
FIG. 11 is a top view of a second embodiment of a lock for the hinge.
Figure 12:
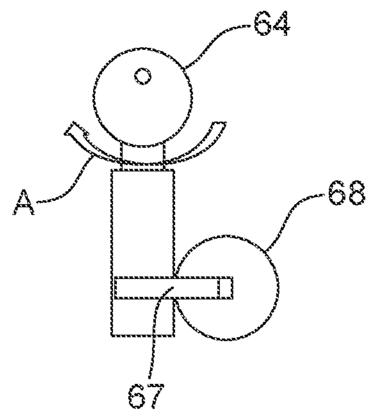
FIGS. 12 and 13 illustrate a keyed cylinder for use in operating the lock of FIG. 11.
Figure 13:
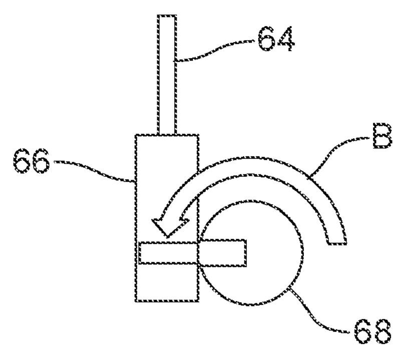

Turning to FIGS. 7 and 8, the second hinge 34*b* may include a rotatable female hinge part 48 for receiving a male hinge part mounted to the opposite side panel (here, panel 28). The male hinge part on this side is not shown, but may be the same in construction as the male hinge part 42, and may be secured to the side panel 28 by a bracket (not shown) similar to bracket 44. While possible, the female hinge part 48 need not include the opening for allowing relative movement in a radial direction, since once the male hinge part 42 of the first hinge 34*a* is released from the female hinge part, the entire tailgate 20 may be moved in a transverse direction to decouple the male hinge part from the female hinge part 48.

The tailgate 20 may be optionally provided with an automatic or powered raising and lowering feature when in position on the vehicle 24. As shown in FIG. 8, the tailgate 20 may include a motor 50 that drives a gear 52. The gear 52 in turn connects with the female hinge part 40, such as by coupling with a similarly (star) shaped receiver 40*b* formed in the base of the female hinge part. Activation of the motor 50 (which may be done by a switch or control in the passenger cabin or externally connected to the vehicle 24, or may be done by a remote control (e.g., key fob or smart phone) thus rotates the female hinge part 40 and, as a consequence of the engagement with the male hinge part 42, raises or lowers the tailgate 20. Power for the motor 50 may be supplied by a power source (battery) onboard the vehicle, which may be connected by suitable cabling 55 that may be disconnected to facilitate removing the tailgate 20 (along with the supports 36, which may be done from a horizontal position of the tailgate prior to raising it to the release position; that is, one in which openings 40*a*, 46*a* are aligned to allow the male hinge part 42 to pass).

To further facilitate the raising and lowering, the tailgate 20 may also be provided with a torsion bar 56. This torsion bar 56 may be coupled to the female hinge part 48 at the opposite (non-driven) end of the tailgate 20, and may provide sufficient twisting force to bias the tailgate toward the home or upright position. As can be appreciated, the weight of the tailgate 20 itself (which is typically considerable) may be sufficient to overcome the twisting force provided so that no interference is made with the lowering operation. The arrangement may also be that the torque is substantially diminished or released at a particular point in the raising operation (e.g., 80 degrees or more) to facilitate removal of the tailgate 20 from the mounted condition (that is, the torque applied to the female hinge part 48 does not bind the associated male hinge part and prevent its withdrawal in the transverse direction, once the hinge parts 40, 42 have been separated (which as noted may occur at a different (45 degree) relative position).

As can be appreciated, if the tailgate 20 is removed and the female hinge part 42 of the first hinge 34*a* becomes reoriented such that misalignment with the opening 46*a* in the retainer 46 results, the tailgate cannot be reinstalled on the vehicle 24. Thus, according to a first aspect of the disclosure, a lock 60 may be provided for locking the position of the tailgate hinge 34*a*, such as by fixing the position of the female hinge part 40 relative to the tailgate 20 (and, in particular, to maintain the alignment among the openings 40*a*, 46*a*). In one example, the lock 60 may take the form of a removable pin 62 including a shaft 62*a* for connecting the female hinge part 40 with the retainer 46, and thereby fixing the relative positions to ensure that the openings 44*a*, 46*a* remain in alignment once the male hinge part 42 is withdrawn, including when the tailgate 20 is removed from the vehicle. The pin 62 may further include an oversized head 62*b*. The pin 62 may be held in place by a friction or interference fit, or may pass entirely through the assembly and receive a fastener, such as a nut (not shown) for ensuring proper retention in the desired position. The pin 62 may also be substantially centered, as shown, but may also be arranged toward the distal end of the cavity in the female part 40, which advantageously may allow for the partial insertion of the male part 42 prior to withdrawing the pin to release the locking engagement.

Turning to FIGS. 11-15, an alternative form of a lock 60 is shown. In this embodiment, the lock 60 includes a key 64 for unlocking and rotating a cylinder 66, which in turn releases a pin 67 from a shaft 68 when turned (note arrow A). As perhaps best understood from FIG. 14, the shaft 68 is connected to projection 70 that fits within a notch 72 formed in the female hinge part 40, and accessible via an opening in the retainer 46. A tab 74 connected to the shaft 68 may be actuated (depressed) to rotate the shaft in a counterclockwise direction (in the illustrated example, note arrow B) cause the projection 70 to engage the notch 72, and thereby fix the position of the female hinge part 40 such that the respective openings 40*a*, 46*a* are aligned.

Figure 14:
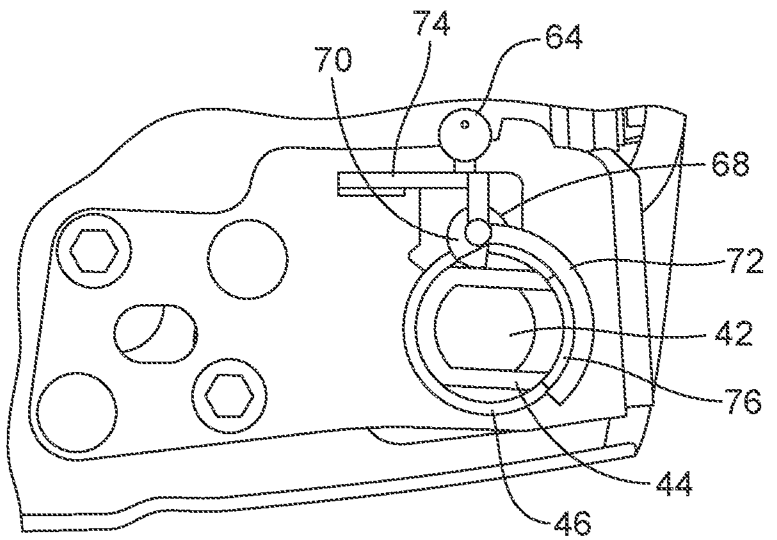
FIGS. 14 and 15 are side views illustrating the locked and unlocked condition of the lock, and further illustrating a cover for preventing the release of the tailgate when in the locked condition.
Figure 15:
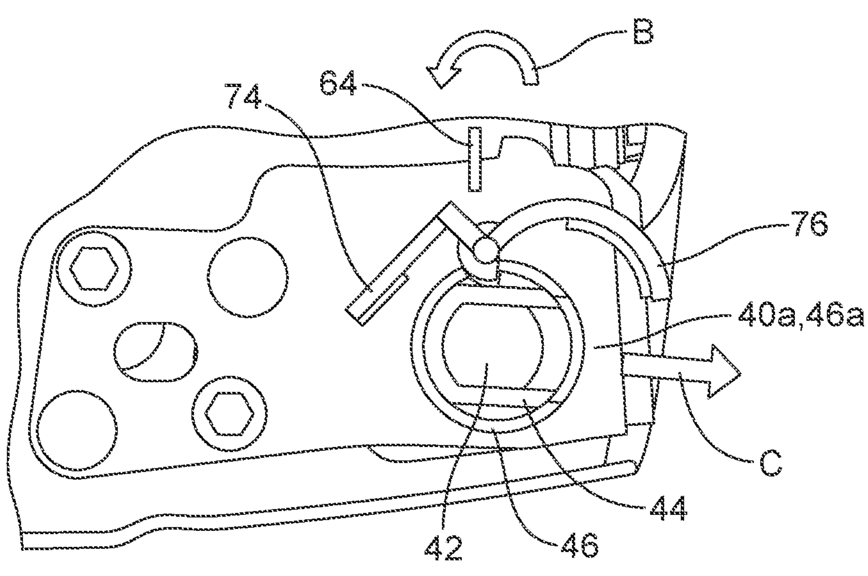

The lock 60 may also include a cover 76 for covering the openings 40*a*, 46*a* in the locked position, as indicated in FIG. 14. When the lock 60 is unlocked by rotating the shaft 68, the openings 40*a*, 46*a* are thus exposed, which allows the male hinge part 42 to pass and the tailgate 20 to be released, as noted previously and as indicated by action arrow C. The notch 72 in engagement with the projection 70 thus retains the openings 40*a*, 46*a* in alignment for so long as the lock 60 is in the unlocked condition, thereby assuring that the alignment remains proper for receiving the male hinge part 42 of the hinge 34*a* during the reinstallation of the tailgate 20.

This disclosure may also be considered to relate to a method for operating a hinge for a tailgate of a vehicle. The steps of the method include orienting a hinge part to a release position for separating the tailgate from the vehicle, and locking a position of the hinge part. The hinge may comprise a first hinge part on the vehicle and a second, mating hinge part on the tailgate and including an opening for releasing the first hinge part in a radial direction, the method further including at least partially covering the opening to prevent the removal of the first hinge part therethrough.

In summary, numerous benefits are provided by providing a removable tailgate 20 for a vehicle 24, such as a pickup truck, with a locking hinge 34*a*. Part of the hinge 34*a* (female hinge part 40) associated with the tailgate 20 (and possibly coupled to a source of power, such as motor M) may be locked in position using an associated lock 60 to ensure that it remains in the correct position for releasing and receiving another part of the hinge (male hinge part 42). In one embodiment, the lock 60 further includes a cover 76 lockable with a key 64 for preventing the relative release of the hinge parts 40, 42, without compromising the raising and lowering of the tailgate 20 as part of the normal operation. Efficiency is thereby improved, and operator frustration avoided, while also providing an enhanced measure of security to aid in preventing theft of the tailgate 20 from the vehicle 24.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hinge assembly for moving a tailgate about a hinge axis, comprising:
- a first hinge part;
- a second hinge part for mating with the first hinge part, the second hinge part being mounted for rotation with respect to the tailgate and having a release position for releasing from the first hinge part; and
- a lock for locking the second hinge part in the release position.

2. The hinge assembly of claim 1, wherein the second hinge part comprises a female hinge part including an opening for receiving a male hinge part serving as the first hinge part in a radial direction relative to the hinge axis.

3. The hinge assembly of claim 2, wherein the lock comprises a shaft adapted for engaging the female hinge part in a locked position to prevent rotation of the female hinge part relative to the tailgate.

4. The hinge assembly of claim 3, wherein the shaft includes a projection for engaging a notch in the female hinge part in the locked position.

5. The hinge assembly of claim 4, further including a cylinder adapted for receiving a key for selectively locking and unlocking the shaft.

6. The hinge assembly of claim 5, wherein the key actuates a pin for locking the position of the shaft.

7. The hinge assembly of claim 2, wherein the lock comprises a cover for at least partially covering the opening in a locked position to prevent the male hinge part from exiting in the radial direction.

8. The hinge assembly of claim 7, wherein the cover is mounted for pivoting to expose the opening.

9. The hinge assembly of claim 8, wherein the cover includes a tab for pivoting the cover when depressed.

10. A vehicle including the hinge assembly of claim 1.

11. A tailgate assembly for a vehicle, comprising:
- a tailgate adapted for being removed from the vehicle;
- a hinge for raising and lowering the tailgate about a hinge axis, said hinge including a first hinge part connected to the vehicle and a second, mating hinge part carried on and mounted for rotation with respect to said tailgate; and
- a lock for locking a position of the second hinge part relative to the tailgate.

12. The tailgate assembly of claim 11, wherein said lock locks said second, mating hinge part in a release position.

13. The tailgate assembly of claim 12, wherein the second hinge part include an opening for releasing the first hinge part in a radial direction, the tailgate assembly further including a cover for at least partially covering the opening to prevent removal of the first hinge part therethrough.

14. The tailgate assembly of claim 13, wherein the cover includes a locked position for covering the opening and an unlocked position for exposing the opening to allow the first hinge part to pass through the opening, the unlocked position of the cover retaining the first hinge part in a fixed position.

15. The tailgate assembly of claim 14, wherein the cover comprises a shaft adapted for engaging the second hinge part in the fixed position to prevent rotation of the first hinge part relative to the tailgate.

16. The tailgate assembly of claim 15, wherein the shaft includes a projection for engaging a notch in the second hinge part in the unlocked position.

17. The tailgate assembly of claim 15, further including a cylinder adapted for receiving a key for selectively locking and unlocking the shaft.

18. The tailgate assembly of claim 12, further including a motor for raising and lowering the tailgate.

19. A method for operating a hinge for a tailgate of a vehicle, comprising:

rotating a hinge part carried on the tailgate and thereby orienting said hinge part into a release position for separating the tailgate from the vehicle; and locking the hinge part in said release position.

20. The method of claim 19, wherein the hinge comprises a first hinge part on the vehicle and a second, mating hinge part on the tailgate and including an opening for releasing the first hinge part in a radial direction, the method further including at least partially covering the opening to prevent removal of the first hinge part therethrough.

* * * * *